(12) United States Patent
Gomez et al.

(10) Patent No.: US 10,094,492 B2
(45) Date of Patent: Oct. 9, 2018

(54) INTEGRAL MOUNTING FEATURES

(71) Applicant: Hewlett-Packard Development Company, L.P., Houston, TX (US)

(72) Inventors: Adolfo Gomez, Fort Collins, CO (US); Thomas A. Bondurant, Fort Collins, CO (US); Omar Pena, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/567,605

(22) PCT Filed: Jun. 10, 2015

(86) PCT No.: PCT/US2015/035070
§ 371 (c)(1),
(2) Date: Oct. 18, 2017

(87) PCT Pub. No.: WO2016/200378
PCT Pub. Date: Dec. 15, 2016

(65) Prior Publication Data
US 2018/0128398 A1    May 10, 2018

(51) Int. Cl.
*F16L 3/08* (2006.01)
*F16L 3/13* (2006.01)
*H02G 3/32* (2006.01)

(52) U.S. Cl.
CPC . *F16L 3/13* (2013.01); *H02G 3/32* (2013.01)

(58) Field of Classification Search
USPC .............................. 248/68.1, 74.1
See application file for complete search history.

(56) References Cited

U.S. PATENT DOCUMENTS

| | | | | |
|---|---|---|---|---|
| 3,154,281 A | * | 10/1964 | Frank | F16B 21/06 174/138 G |
| 5,730,402 A | * | 3/1998 | Sallen | F16L 3/127 248/74.1 |
| 5,957,415 A | * | 9/1999 | Perea | F16L 55/035 248/58 |
| 6,612,525 B2 | * | 9/2003 | Bagdi | F16B 21/02 248/71 |
| 7,318,621 B2 | * | 1/2008 | Suzuki | B60R 16/0215 296/1.08 |
| 7,678,998 B2 | | 3/2010 | Lind et al. | |

(Continued)

FOREIGN PATENT DOCUMENTS

| JP | 10144146 | 5/1998 |
|---|---|---|
| JP | 2001258137 | 9/2001 |

(Continued)

OTHER PUBLICATIONS

3M™ Cable Tie & Base Assembly 790, Feb. 1, 2001, 1-page, 3M.

*Primary Examiner* — Monica E Millner
(74) *Attorney, Agent, or Firm* — Rahman, LLC (57) ABSTRACT

Example implementations relate to integral mounting features. In one example, a conduit includes a first endpoint, a second endpoint, an exterior surface, and a mounting feature integral with a portion of the exterior surface to removably couple to a corresponding mounting feature integral with a surface of an object, where the mounting feature is located between the first endpoint and the second endpoint of the conduit.

15 Claims, 6 Drawing Sheets

(56) References Cited

U.S. PATENT DOCUMENTS

| | | | |
|---|---|---|---|
| 8,013,248 B2* | 9/2011 | Sakata | H02G 3/0691 |
| | | | 174/40 CC |
| 8,087,425 B2* | 1/2012 | Railsback | F16L 3/1233 |
| | | | 137/355.16 |
| 8,285,104 B2 | 10/2012 | Davis et al. | |
| 8,559,785 B2* | 10/2013 | Barlowe | G02B 6/4471 |
| | | | 385/135 |
| 8,662,455 B2* | 3/2014 | Hernandez | F16B 2/245 |
| | | | 248/222.12 |
| 8,879,881 B2* | 11/2014 | Cote | G02B 6/4471 |
| | | | 174/50 |
| 9,257,822 B2* | 2/2016 | Kitamura | B60R 16/0215 |
| 9,281,670 B2* | 3/2016 | Okuhara | H02G 3/0468 |
| 9,303,792 B2* | 4/2016 | Heims | H02G 3/32 |
| 9,309,033 B2* | 4/2016 | Dorsey | B65D 63/00 |
| 9,534,507 B2* | 1/2017 | Sauerhoefer | F01D 25/243 |
| 9,651,171 B2* | 5/2017 | Zhang | F16L 3/10 |
| 9,701,263 B2* | 7/2017 | Hagi | B60R 16/0215 |
| 2005/0280288 A1 | 12/2005 | Suzuki et al. | |
| 2014/0182086 A1 | 7/2014 | Dorsey et al. | |

FOREIGN PATENT DOCUMENTS

| | | |
|---|---|---|
| JP | 2012249428 | 12/2012 |
| WO | WO-2012112875 | 8/2012 |
| WO | WO-2013140789 | 9/2013 |
| WO | WO-2014060773 | 4/2014 |

* cited by examiner

INTEGRAL MOUNTING FEATURES

BACKGROUND

Conduits such as cables, wires, hoses, etc. are utilized in a variety of applications. Such conduits may be desirably be positioned and/or bundled together, for instance, to promote organization and/or efficient use of space.

DETAILED DESCRIPTION

Conduits such as cables, wires, hoses, etc. are utilized in a variety of applications. For example, a conduit may connect devices to each other and/or to an additional device to promote communication (e.g., electrical connection) and/or material transfer to and/or from the devices. Such conduits may desirably be positioned and/or bundled together, for example, by securing a portion of a length of the conduit to promote organization, promote airflow, and/or efficient use of space, etc.

Some approaches to positioning and/or bundling conduits together may rely on mechanical fasteners. For example, mechanical fasteners such as mechanical clips and/or mechanical ties may be provided in addition to the conduits to position and/or bundle the conduits together. However, such approaches may be ineffective, non-reusable, rely on fastening equipment (e.g., a mechanical tie fastening tool), and/or may result in undesired damage to a conduit, among other difficulties. For example, once fastened to a conduit a mechanical fastener may be intended to remain permanently fastened to the conduit and may not readily promote repositioning or otherwise reconfiguration of the conduit. Moreover, attempts to remove such mechanical fasteners from the conduit may employ tools that may undesirably damage the conduit when attempting to remove the mechanical fasteners.

In contrast, examples of the disclosure include methods and systems employing integral mounting features. As used herein, integral mounting features refer a mounting feature being non-removably and directly coupled to the conduit. Integral mounting features can, for example, include a conduit having a first endpoint, a second endpoint, an exterior surface, and a mounting feature integral with a portion of the exterior surface to removably couple to a corresponding mounting feature integral with a surface of an object, where the mounting feature is located between the first endpoint and the second endpoint of the conduit. Desirably, integral mounting features removably couple to the corresponding mounting feature without a mechanical fastener, as detailed herein, and do not include or employ additional components such as adhesives. As such, the integral mounting features can provide an ability to readily decouple a mounting feature from a corresponding mounting feature and/or recouple the mounting feature to the corresponding mounting feature in contrast to other approaches including those discussed.

Figure 1:
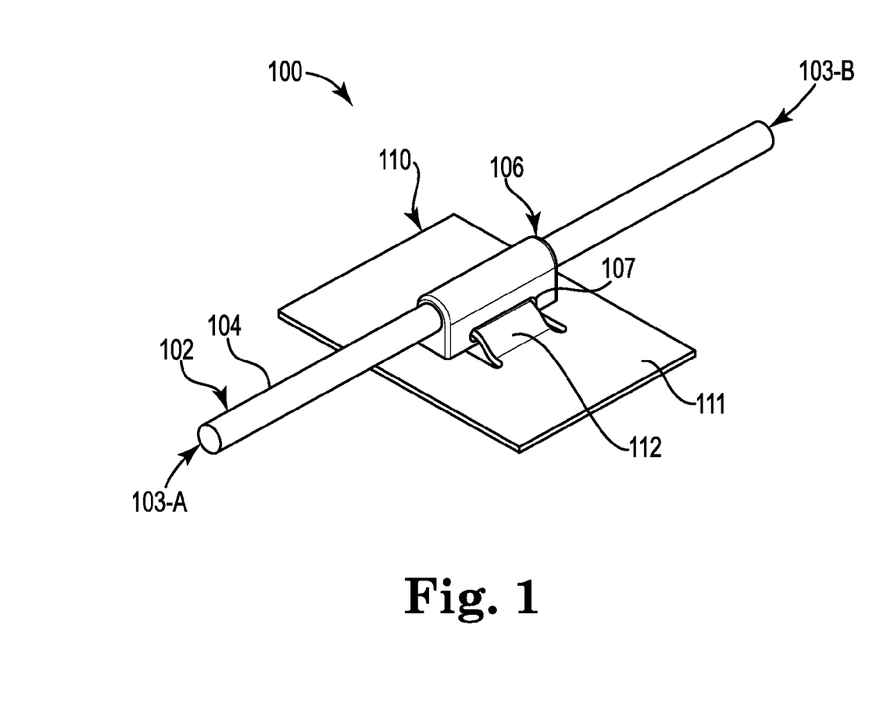
FIG. 1 illustrates a diagram of an example of a system including an integral mounting feature according to the disclosure.

FIG. 1 illustrates a diagram of an example of a system 100 including an integral mounting feature according to the disclosure. The system 100 includes a conduit 102 and an object 110 that is separate and distinct from the conduit 102. That is, the object 110 is a separate component that can be coupled to the conduit 102, as described herein. The object can be a server including a chassis having at least one surface, among other possibilities. The conduit 102 is analogous to conduit 202, 302, 402, 502, 602, 702, 802, and 902 as referenced by FIGS. 2, 3, 4, 5, 6, 7, 8, and 9, respectively. The object is analogous to object 210, 310, 410, 510, 610, 710, 810, and 910 as referenced by FIGS. 2, 3, 4, 5, 6, 7, 8, and 9, respectively.

The conduit 102 includes a mounting feature 106 integral with the conduit 102. For instance, the mounting feature 106 can be integral with a portion of an exterior surface 104 of the conduit 102, as illustrated in FIG. 1. The exterior surface refers to an outer (i.e., exposed) surface area of the conduit 102. As detailed herein, the mounting feature can be directly coupled to the exterior surface 104 of the conduit 102 such that the mounting feature is directly coupled (without an intervening mechanical fastener, etc.) to the corresponding mounting feature of an object. For instance, in various examples, the mounting feature 106 is a molded mounting feature formed of moldable material that is molded (e.g., overmolded) to the conduit without the use of any mechanical fasteners such as mechanical clips, mechanical ties, screws, bolts, etc. and without the use of additional components such as adhesives (e.g., adhesive backings) or components (e.g., welding sticks) employed with welding. That is, as mentioned, the mounting feature 106 removably couples to the corresponding mounting feature without a mechanical fastener. Further, the mounting feature 106, in some examples, does not include orifices such as those utilized in other approaches that may allow mechanical fasteners to be passed through at least a portion of other types of mounts.

The moldable material can be a polymer or other suitable moldable material capable of being molded to the conduit 102. The mounting feature 106 is non-removably coupled to the conduit 102. In some examples, the moldable material is formed of a polymer that does not include metal.

While FIG. 1 illustrates the mounting feature 106 surrounding an entire circumference of a section of the conduit 102 the disclosure is not so limited. That is, the mounting feature 106 is non-removably coupled (e.g., by molding the mounting feature 106 to a portion of the conduit 102) and surround more or less of the conduit 102 than is illustrated in FIG. 1 to promote integral mounting features, as described herein. Put another way, in various examples, the conduit 102 includes the mounting feature 106 that is integral with a portion of the exterior surface 104 of the conduit 102.

The conduit 102 can be a solid, hollow, or partially filled conduit having various dimensions including a length extending from a first endpoint 103-A of the conduit 102 to a second endpoint 103-B of the conduit. The conduit can include connectors or other components at the first endpoint 103-A and/or the second endpoint 103-B, among other locations along the length of the conduit. As is illustrated in FIG. 1, the first endpoint 103-A and the second endpoint 103-B are opposing endpoints of the conduit 102 located along the length (i.e., on the same geometric plane) of the conduit 102.

Notably, the mounting feature 106 is located between the first endpoint 103-A and the second endpoint 103-B to secure the length of the conduit in a desired manner. Put another way, the mounting feature 106 is located a fixed distance from endpoints (e.g., the first endpoint 103-A and the second endpoint 103-B) of the conduit 102. That is, the mounting feature 106 is located at least some amount of distance from both the first endpoint 103-A and the second endpoint 103-B as is illustrated in FIG. 1.

The distances to the first endpoint 103-A and the second endpoint 103-B may be the same (i.e., the mounting feature 106 is located at a midpoint of the conduit 102) or the distances from the first endpoint 103-A and the second endpoint 103-B may be different (i.e., the mounting feature 106 is located off-center of the conduit 102). That is, the mounting feature, in various examples, is not located at an endpoint of the conduit 102, however, in some examples a mounting feature can be located at an endpoint of the conduit. Having the mounting feature 106 at a fixed location along the conduit 102 that is removably coupled to a corresponding mounting feature can desirably promote decoupling the mounting feature from the corresponding mounting feature and/or recoupling the mounting feature to the corresponding mounting feature, etc.

In some examples, conduit is a cable including an electrical wire. For example, the conduit can be a cable including a plurality of electrical wires. Such cables can include those suitable for use with computing components such as servers, among other possibilities. The conduit can be formed of a number of materials such as plastics (e.g., polymers) and/or metals, among other materials suitable to promote integral mounting features, as described herein.

As described herein, the mounting feature 106 can include a recessed slot (such as slot 107) and/or a plug, among other possibilities to promote integral mounting features, as described herein. A relative position of such a slot and/or a plug can be varied on a mounting feature. For example, a recessed slot such as the slot 107 can be positioned on a face such as a side of the mounting feature that is generally parallel with the length of the conduit 102, as illustrated in FIG. 1.

However, as detailed herein, the disclosure is not so limited. That is, a total number of the slot(s) and/or a total number of the plug(s) and/or respective geometries of the slot(s) and/or plug(s) can be varied. For instance, in some examples, a single mounting feature can include multiple slots, multiple plugs, and/or combinations thereof. Moreover, a relative position of the slot and/or plug can be varied to be on (in or extending from) any face or surface of the mounting feature depending upon a desired application and/or performance characteristic of the mounting feature including the same, among other possibilities.

The mounting feature 106 is to removably couple to a corresponding mounting feature 112 of a surface 111 of the object 110. That is, the object 110 has the surface 111 including the corresponding mounting feature 112 to removably couple to the mounting feature 106 of the conduit 102. In this manner, the conduit 102 and the object 110 can be removably coupled. As described herein, a corresponding mounting feature can be a tab extending from the surface, an opening in the surface, and combinations thereof. For example, as illustrated in FIG. 1, the mounting feature 106 is a tab. Such tabs can be of a variety of shapes, sizes, surface textures (e.g., smooth, barbed with at least one bard feature included in the tab that extends outward from a body of the tab to promote contact and/or retention of the tab with a corresponding mounting feature, etc.) to promote integral mounting features as described herein. In any case, as discussed the object 110 has the surface 111 including the corresponding mounting feature 112 to removably couple to the mounting feature 106 of the conduit 102.

Figure 2:
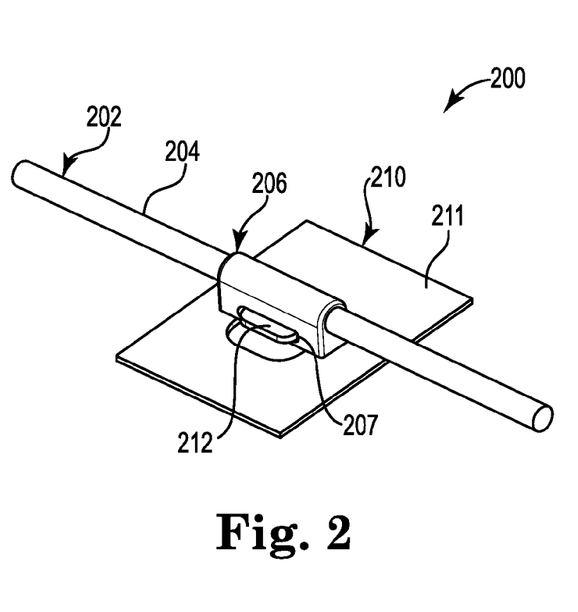
FIG. 2 illustrates a perspective view of the example of the system of FIG. 1 according to the disclosure.

FIG. 2 illustrates a perspective view of the example of the system 200 of FIG. 1 according to the disclosure. As illustrated in FIG. 2, the corresponding mounting feature 212 is a tab extending from the surface 211 of the object 210. The mounting feature can be positioned, as described herein, such that the corresponding mounting feature extends through the mounting feature 206 (through slot 207 of the mounting feature 206) integral with a portion of the exterior surface 204 of the conduit 202. However, the present disclosure is not so limited. Rather, in some examples, a mounting feature can extend through a corresponding mounting feature. In either case, the mounting feature or the corresponding mounting feature extends at least partially through the corresponding mounting feature or the mounting future, respectively.

Figure 3:
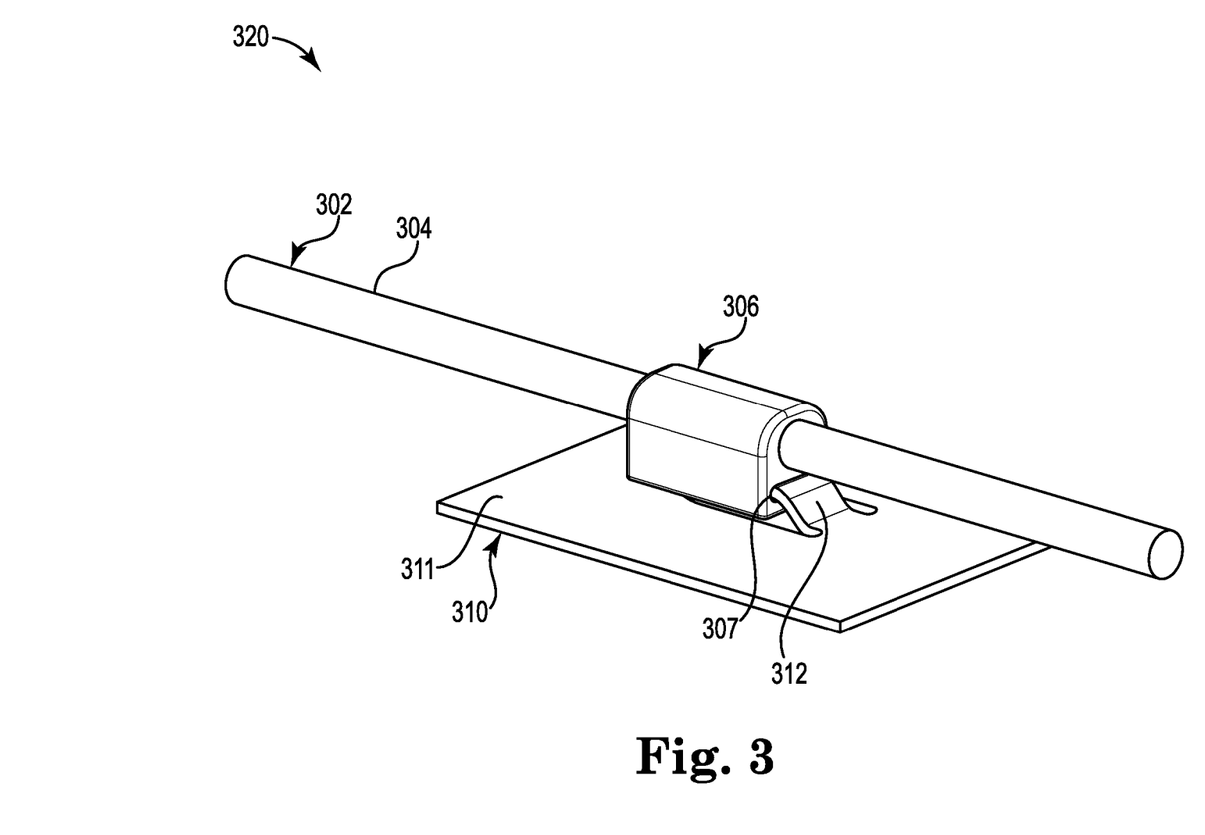
FIG. 3 illustrates a diagram of an example of a system including an integral mounting feature according to the disclosure.

FIG. 3 illustrates a diagram of an example of a 320 system including an integral mounting feature according to the disclosure. As illustrated in FIG. 3, the slot 307 included in the mounting feature 306 can be positioned on a face (e.g., a side) of the mounting feature 306 extending generally perpendicular to the length of the conduit 302. In this manner, the corresponding mounting feature 312 of the object 310 extends at least partially through the slot 307 integral with the portion of the exterior surface 304 of the conduit 302.

Figure 4:
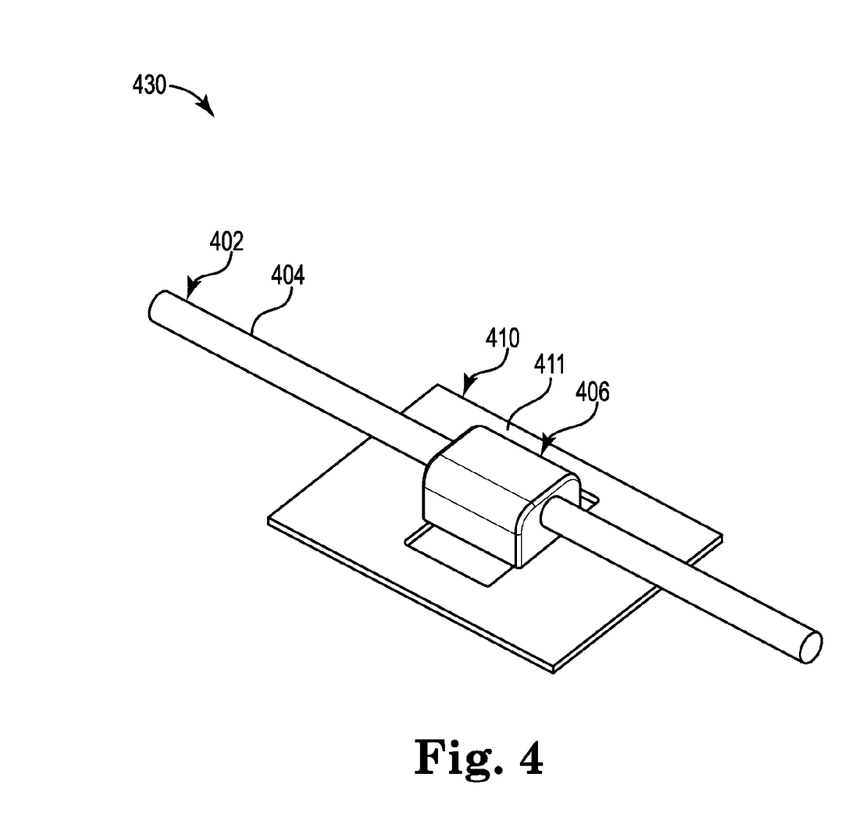
FIG. 4 illustrates a diagram of an example of a system including an integral mounting feature according to the disclosure.

FIG. 4 illustrates a diagram of an example of a 430 system including an integral mounting feature according to the disclosure. As mentioned, the mounting feature can include a slot (e.g., multiple slots), a plug (e.g., multiple plugs), and/or combinations thereof. For example, the mounting feature 406 includes two slots (not shown in FIG. 4 for ease of illustration) positioned on a bottom face of the mounting feature 406 that is integral with the portion of the exterior surface 404 of the conduit 402. The mounting feature 406 is to couple with the corresponding mounting feature (not shown in FIG. 4 for ease of illustration) integral with the surface 411 of the object 410.

Figure 5:
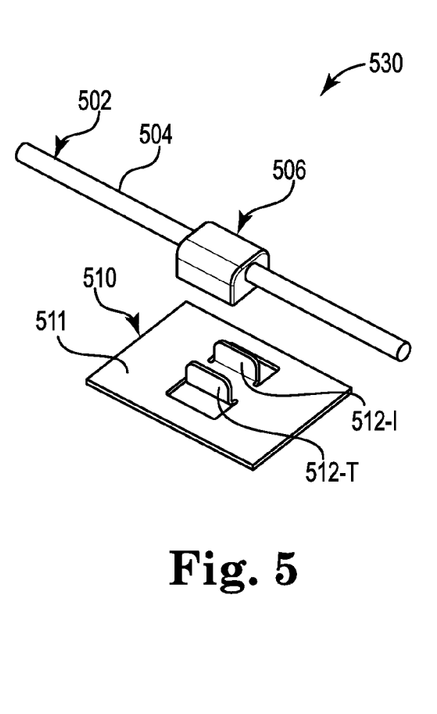
FIG. 5 illustrates a perspective view of the example of the system of FIG. 4 according to the disclosure.

FIG. 5 illustrates a perspective view of the example of the system of FIG. 4 according to the disclosure. As illustrated in FIG. 5, the system 530 can include two corresponding mounting features 512-1, 512-T that are to removably coupled to the two slots of the mounting structure 506 integral with the portion of the exterior surface 504 of the conduit 502. While FIG. 5 illustrates two corresponding mounting structures, the disclosure is not so limited. That is, a total number of the mounting structures and/or a total number of corresponding mounting structures can be varied. While FIG. 5 illustrates the corresponding mounting structures as being integral with the surface 511 of the object such structures may or may not be integral with the surface 511 of the object. For instance, such structures may be removably attached and/or indirectly coupled to the object. Moreover, while FIG. 5 illustrates the corresponding mounting structures integral with the surface 511 of the object 510 as being substantially parallel to each other and to the length of the conduit 502 the locations and orientations of the mounting structures and the corresponding mounting features 512-1, 512-T can be varied.

Figure 6:
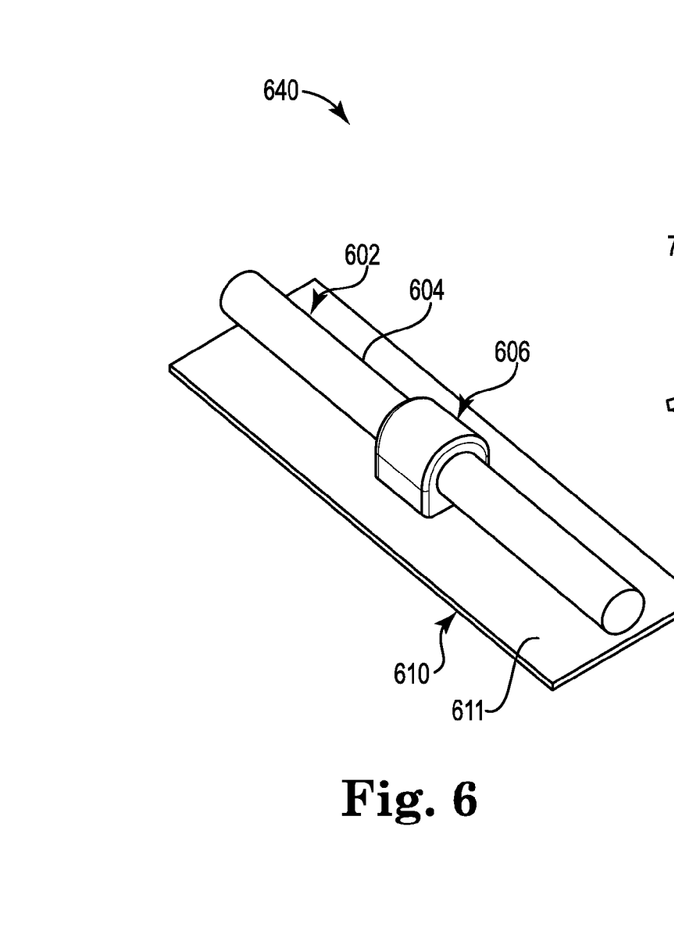
FIG. 6 illustrates a diagram of an example of a system including an integral mounting feature according to the disclosure.

While illustrated in FIG. 5 and various other Figures as a single mounting feature, in some examples, the mounting feature can be included in a plurality of mounting features. For instance, each of the plurality of mounting features can be integral with an exterior surface of a conduit and can be located between endpoints of the conduit. In such examples, the plurality of corresponding mounting features can removably couple to mounting features of the plurality of mounting features FIG. 6 illustrates a diagram of an example of a system 640 including an integral mounting feature according to the disclosure. The system can include the mounting feature 606 that is integral with the surface 604 of the conduit 602. In some examples, the mounting feature 606 can include a plug. For instance, the plug can be a protruding plug that extends as least partially through an opening in the surface 611 of the object 610, as illustrated in FIG. 6.

Figure 7:
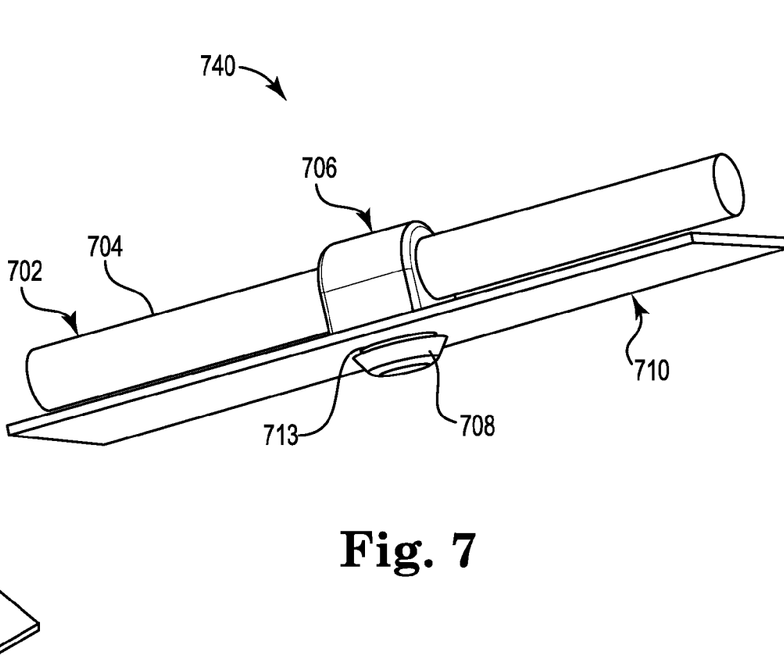
FIG. 7 illustrates a perspective view of the example of the system of FIG. 6 according to the disclosure.

FIG. 7 illustrates a perspective view of the example of the system of FIG. 6 according to the disclosure. In some examples, a corresponding mounting feature 713 can be an opening in a surface of an object. As illustrated in FIG. 7, the opening can be circular however the shape, size, and a total number of such openings can be varied. In addition, the opening(s) can be of a variety of shapes, sizes, and/or include surface textures (e.g., smooth, barbed having at least one bard feature included in an edge of the opening extends outward from the edge of the opening to promote contact and/or retention with another feature (such as a tab of a mounting feature, among other possibilities) to promote integral mounting features as described herein.

As illustrated in FIG. 7, the mounting feature 706 integral with the portion of the exterior surface 704 of the conduit 702 can include a plug 708 that extends at least partially through the corresponding mounting feature 713 integral with the surface of the object 710. The plug can be circular, as illustrated, among other possible shapes such as square and/or include tapered edges, among other possibilities.

Figure 8:
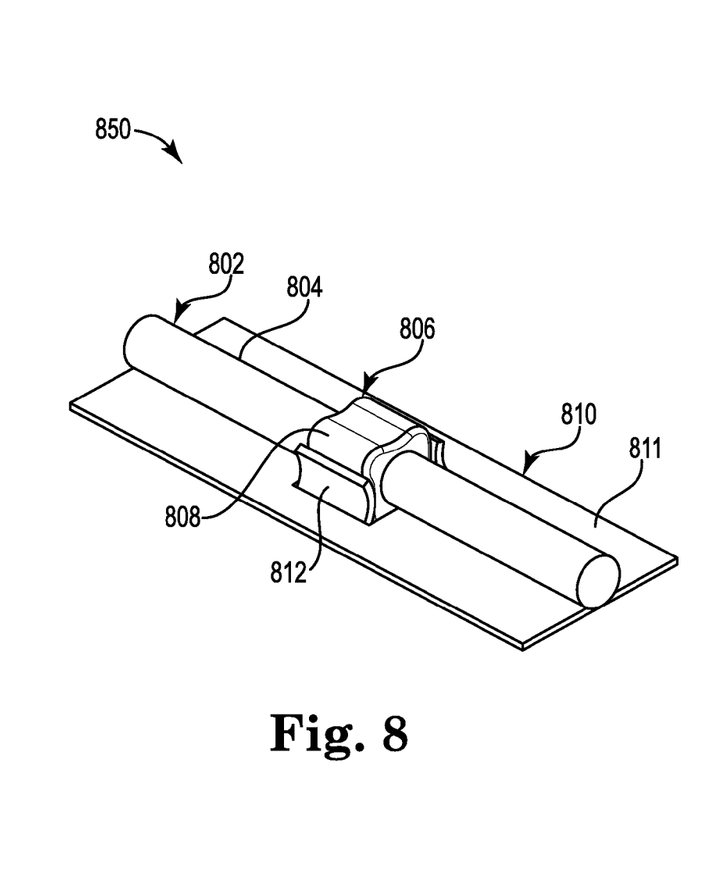
FIG. 8 illustrates a diagram of an example of a system including an integral mounting feature according to the disclosure.

FIG. 8 illustrates a diagram of an example of a system 850 including an integral mounting feature according to the disclosure. As illustrated in FIG. 8, the system 850 can include a mounting feature 806 integral with the portion of the exterior surface 804 of the conduit 802 that include a plug 808 with a curved portion that is recessed relative to other portions of the plug. The corresponding mounting feature integral with the surface 811 of the object 810 can include tabs 812 along with an opening, as detailed with respect to FIG. 9.

Figure 9:
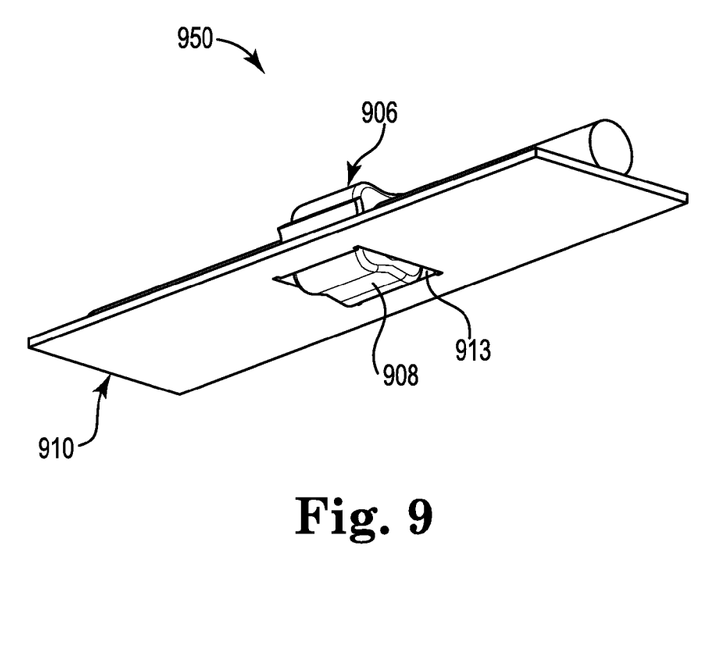
FIG. 9 illustrates a perspective view of the example of the system of FIG. 8 according to the disclosure.

FIG. 9 illustrates a perspective view of the example of the system of FIG. 8 according to the disclosure. The system 950 includes the corresponding mounting feature 913 that is integral with the surface of the object 910 includes a tab (see FIG. 8 illustrating tabs 812 extending from the surface 811). Additionally, the corresponding mounting feature 913 includes an opening in the surface suitable to couple to at least a portion of the mounting feature 906 integral with the portion of the exterior surface of the conduit 902 in that at least a portion of the mounting feature 906 is to extend through the corresponding mounting feature 913. The plug 908 including the curved portion that is recessed mates with the a portion of the geometry (e.g., curved portions of tab 812) of the corresponding mounting feature 913, as is illustrated in FIG. 9, such that the curved portion that is recessed is in contact with the curved portion of the tab by way of an friction fit (i.e., an interference fit).

Figure 10:
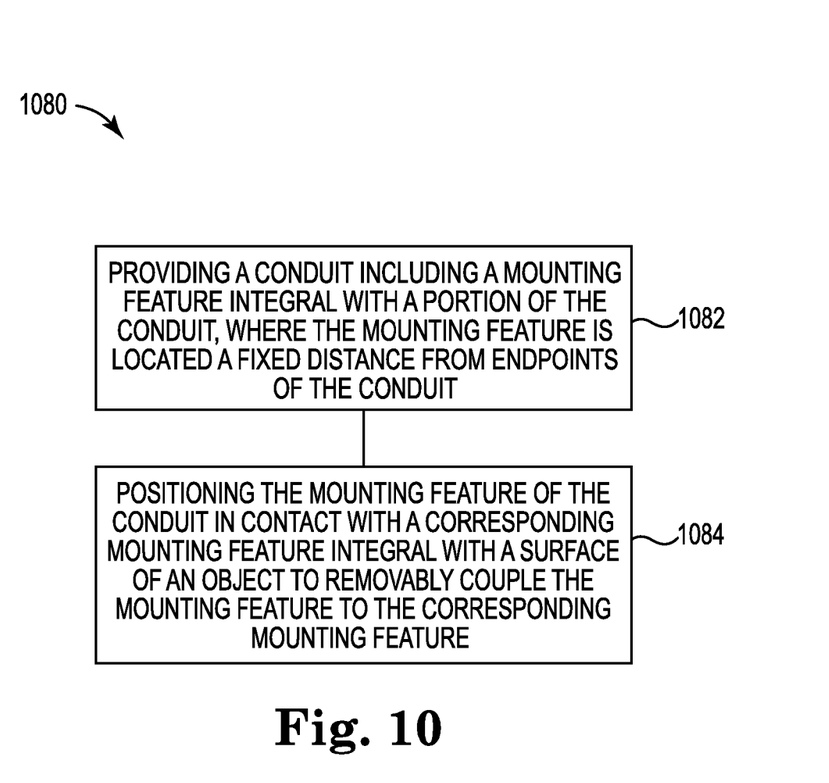
FIG. 10 illustrates a flow diagram of an example of a method suitable with integral mounting features according to the disclosure.

FIG. 10 illustrates a flow diagram of an example of a method suitable with integral mounting features according to the disclosure. As illustrated at 1082, the method 1080 can include providing a conduit including a mounting feature integral with a portion of the conduit, where the mounting feature is located a fixed distance from endpoints of the conduit. Providing can include manufacture and/or otherwise procuring the conduit. The method 1080 can include positioning the mounting feature of the conduit, provided at 1082, in contact with a corresponding mounting feature integral with a surface of an object to removably couple the mounting feature to the corresponding mounting feature.

Providing and positioning of the mounting feature of the conduit can promote to promote integral mounting features, as described herein. For instance, in some examples the method 1080 can include decoupling the mounting feature from the corresponding mounting feature and can include recoupling the mounting feature to the corresponding mounting feature.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a number of" an element and/or feature can refer to one or more of such elements and/or features.

What is claimed:
1. A conduit, comprising:
a first endpoint of the conduit;
a second endpoint of the conduit;
an exterior surface of the conduit; and
a first mounting feature integral with a portion of the exterior surface of the conduit to removably couple to a corresponding second mounting feature integral with a surface of an object, wherein the first mounting feature is located between the first endpoint and the second endpoint of the conduit, wherein the first mounting feature comprises a recessed slot creating an opening through a body portion of the first mounting feature, and wherein the recessed slot is to accommodate the corresponding second mounting feature and without accommodating the conduit.

2. The conduit of claim 1, where the first mounting feature is directly coupled to the corresponding second mounting feature.

3. The conduit of claim 1, where the first mounting feature is formed of moldable material.

4. The conduit of claim 1, where the first endpoint and the second endpoint are opposing endpoints of the conduit located along a length of the conduit.

5. The conduit of claim 1, where the conduit is a cable including an electrical wire.

6. The conduit of claim 1, where the corresponding second mounting feature includes a tab.

7. The conduit of claim 1, where the first mounting feature includes a protruding plug.

8. A system, comprising:
a conduit including a first mounting feature integral with a portion of an exterior surface of the conduit, where the first mounting feature is located between endpoints of the conduit; and
an object having a surface including a corresponding second mounting feature to directly and removably couple to the first mounting feature of the conduit,
wherein the first mounting feature comprises a recessed slot creating an opening through a body portion of the first mounting feature, and wherein the recessed slot is to accommodate the corresponding second mounting feature and without accommodating the conduit.

9. The system of claim 8, where the first mounting feature is included in a plurality of first mounting features each integral with the exterior surface and located between the endpoints of the conduit.

10. The conduit of claim 9, where the first mounting feature is non-removably coupled to the conduit.

11. The system of claim 10, where the corresponding second mounting feature is included in a plurality of corresponding second mounting features to respective first mounting features of the plurality of first mounting features.

12. The system of claim 9, where the corresponding second mounting feature is selected from a tab extending from the surface of the object, an opening in the surface of the object, and combinations thereof.

13. The system of claim 9, where the object is separate and distinct from the conduit.

14. A method, comprising:
providing a conduit including a first mounting feature integral with a portion of the conduit, where the first mounting feature is located a fixed distance from endpoints of the conduit; and
positioning the first mounting feature of the conduit in contact with a corresponding second mounting feature integral with a surface of an object to removably couple the first mounting feature to the corresponding second mounting feature,
wherein the first mounting feature comprises a recessed slot creating an opening through a body portion of the first mounting feature, and wherein the recessed slot is to accommodate the corresponding second mounting feature and without accommodating the conduit.

15. The method of claim 14, including decoupling the first mounting feature from the corresponding second mounting feature and recoupling the first mounting feature to the corresponding second mounting feature.

* * * * *